United States Patent
Mackie

[15] 3,693,279
[45] Sept. 26, 1972

[54] SOUND PRODUCING FISHING LURE

[72] Inventor: Kenneth Mackie, 23 Riverside Rd., Alnmouth, England

[22] Filed: April 14, 1970

[21] Appl. No.: 28,451

[30] Foreign Application Priority Data

April 18, 1969 Great Britain..........19,840/69

[52] U.S. Cl. ..............43/42.06, 43/42.28, 43/42.31,
[51] Int. Cl. ............................................A01k 85/04
[58] Field of Search....43/42.28, 42.31, 42.36, 42.37, 43/42.44, 42.06

[56] References Cited

UNITED STATES PATENTS 1,750,783   3/1930   Pemberton ..............43/42.44

*Primary Examiner*—Melvin D. Rein
*Attorney*—Watson, Cole, Grindle & Watson

[57] ABSTRACT

The invention described relates to a fishing lure in which relative motion through the water when fishing promotes two different modes of vibration or oscillation due to the hydrodynamic instability of two hydrofoil elements. One of the modes produces percussive waves in the water in the manner of a rattle and the other produces acoustic waves of a continuous nature. The lure comprises a hook which is pivotally connected at its eye to a striker element and free to rotate about an axis spaced from the end at which the hook line is attached and about which the striker may rotate. The striker presents a rearwardly directed extension against which the shank of the hook may percussively impact and is apertured to provide a water passageway therethrough. Further, at least one flexible laminar element is mounted on the hook so as to be attached to the hook shank near the eye and is impaled near the barb. This latter element which is responsible for undulatory oscillations occasions the acoustic waves.

13 Claims, 4 Drawing Figures

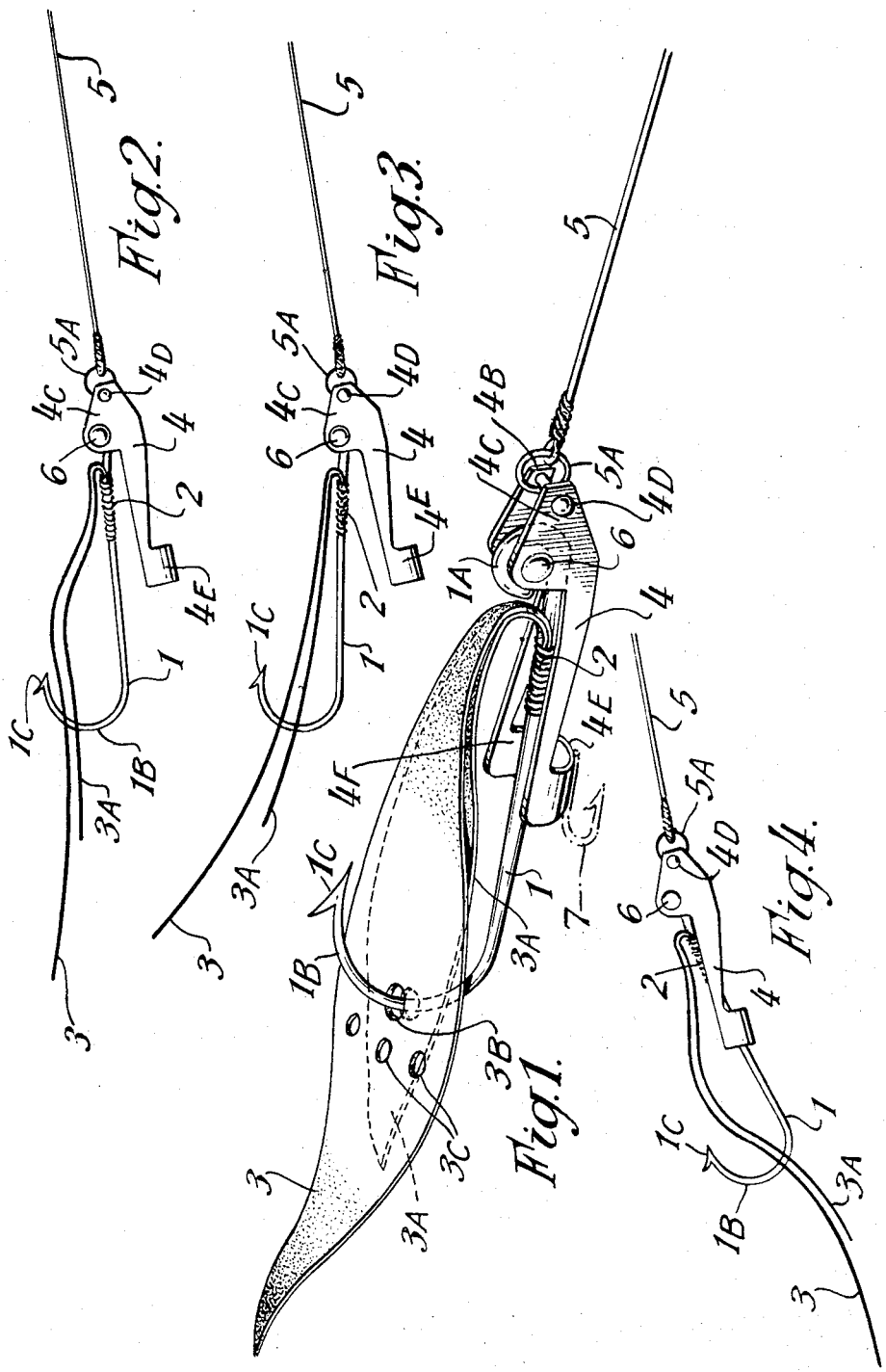

SOUND PRODUCING FISHING LURE

The invention relates to lures for use by fishermen when trolling for fish; that is to say, in the procedure of fishing which involves streaming a line and a lure with relative water speed passing the lure. This is usually accomplished by streaming the line and lure behind a boat, but it can be done by streaming in a fast-flowing current of water or by casting a line and pulling it in, as is usually called spinning.

The lure provided by the invention has been found by comparative trial in various circumstances to be highly and advantageously effective. There is at least one previously proposed lure (as can be seen in French Pat. specification No. 1,038,291 and its Addition No. 62,198) in which a hook was combined with a leaf-like vibratory hydrofoil element of pliable material which was made fast to the forward (upstream) part of the shank of a hook, and further back (downstream) was impaled on the hook, and which streaming behind the hook was unstable in the relative water stream (somewhat as a flag is unstable in the wind) and which therefore waved in an undulatory manner in a dimension corresponding approximately with the plane in which the bend of the hook is lying. It is thought that such a lure is attractive to a predatory fish both by its visible motion (which one may suppose, resembles the motion of a small fish which is neutral prey) and possibly because it promotes pressure-waves of acoustic nature which, again to a predator, resemble those which could be promoted by prey. The present invention preferably makes use of such a device for such visual and acoustic merit it has, and combines with it a further attraction to a predator, in the form of a sequence of percussive waves, of a frequency which tests show is attractive to a predator (which frequency may easily be varied).

The invention therefore involves as an essential feature, the promotion of a sequence of percussive waves energized by the streaming of a lure in water; and this is preferably associated with and indeed actuated by an element which is oscillated by streaming in the water and which is equivalent to the known leaf-like element above mentioned.

It may be said that the oscillatory means of the invention resides in the provision of at least one hydrofoil element which is unstable in a relative water stream. This element is, primarily, the leaf above mentioned, which being initially flat, is unstable when streamed just as the leech of a flag is unstable, and causes the flag to perform an undulatory oscillation when streaming in a wind. There may, however, be a secondary hydrofoil element, as will be described below.

The invention resides primarily in a fishing lure comprising a hook with a shank and a striker mounted so as to oscillate relatively to the shank and to strike it in a sequence of percussive impacts, the striker being so formed and mounted that its oscillations are caused by the flow past it of water in which the hook is streamed.

Such lure preferably further comprises a flexible element so attached to the lure and formed as to vibrate at an acoustic frequency its vibration being caused by the flow past it of water in which the hook is streamed.

The invention further resides in a lure for fish including a hook and a striker associated with the hook so as to strike it with recurrent impacts when relative oscillations between itself and the hook occur and means so arranged as to cause such relative oscillations when the lure is streamed in water. Preferably the means (to cause the relative oscillations) includes an unstable hydrofoil element attached to the lure in such a manner as to cause relative oscillation between the hook and the striker by virtue of the instability of the element when streamed in water. A lure according to the foregoing is preferably one in which there is attached to the hook a flexible leaf-like undulatory hydrofoil so as to stream behind the hook its attachment being such as to exert a tension load on the hook at a first axis which is transverse to the plane in which the hook is formed at which first axis the hook and the striker are pivotally interattached, and the striker is attached to the hook line through a second axis which is spaced from the first and which is so located with respect to the first that oscillations occurring relatively between the hook and the striker are caused by the interaction of tension in the line acting on the striker and undulations of the hydrofoil reacting on the hook.

The invention is described below by way of example, with reference to the accompanying drawings in which FIG. 1 is a perspective illustration of a lure according to the invention and FIGS. 2, 3, and 4 are diagrammatic side elevations to illustrate phases of operation of the lure of FIG. 1.

In these drawings the hook has a shank 1 which at one end is bent to form a closed eye at 1A, and at the other end is bent as at 1B in a plane which includes the shank 1 and eye 1A to form the effective part of the hook, which is armed with a barb at its sharp point 1C. To the shank 1 just downstream from or below the eye 1A is secured, as by binding at 2, the root end of a pair of leaf-like highly flexible laminar elements 3, 3A, formed of thin rubberized fabric or like material (or fabric impregnated with a plastics substance). This material may be colored or rendered light-reflective or fluorescent, or otherwise so as to produce optical effects. The elements 3, 3A are impaled on the hook 1C which passes with clearance through holes at 3B in the elements 3, 3A. Further holes at 3C are made through the elements; it is found that these both serve to allow water to pass from one side to the other of the elements so affecting their hydrodynamic performance, but also constituting an area of reduced stiffness and therefore providing a nodal region for the undulatory oscillations of the elements. The elements act as an unstable hydrofoil in the same that the loads imposed upon them, which cause their oscillation, are due to the relative flow of water in which they operate when being streamed or towed. When made approximately in the shape and proportions illustrated, and of the material mentioned above, the oscillatory effect is of humanly audible frequency; it seems from trials that this is in itself attractive to fish, and it is also the fact that the appearance of the elements when undulating, at least to the human observer, resembles that of a swimming fish. The dimension in which the undulations occur is, roughly, in the plane in which lies the hook 1B, and the hole 3B is large enough to enable the elements 3, 3A, to oscillate freely on the hook. It is to be noted however that the distance between the binding at 2 and the hole 3B is such that the material of the leaves is slightly lowered (as can be seen in FIG. 4 for example) and this is the equivalent of a camber or "blade curvature," in terms of a hydrofoil, and results in forces which act unstably, the contour of the leaves rapidly reversing in oscillatory manner. The disposition of the eye 1A and the elements 3, 3A, when assembled as described below is such that in practice, the hook 1B rides in upright manner (that is with its point 1C upwards) providing that no torque from the hook line prevents it from doing so.

The lure also comprises a striker. This is seen at 4. It is basically a U-sectioned channelled element, conveniently a sheet-metal pressing. At its upstream (forward) end its side parts of flanges 4B, 4C are transfixed by a pin 4D which constitutes a free pivotal attachment for a ring 5A to which is intended to be secured the hook line or trace 5. Also transfixing the flanges 4B, 4C and further downstream is a pin 6. This acts as a free pivotal connection with the eye 1A of the hook. The pins 4D and 6 have parallel axes which are substantially normal to the plane in which lies the hook 1B. The part of the striker 4 downstream from the pin 6 is apertured at 4F, as far as its rearmost portion at 4B at which the U-section is resumed (see FIG. 1). This portion 4F acts as a rigid hydrofoil; water can of course pass through the aperture 4, and thus the portion 4F has incidence, (positive, negative, or neutral) to the relative stream, such as to exert upward or downward force which can be regarded as a movement about the pin 6. This (having regard to the somewhat critical alignment and relationship between the pins 4D and 6, the tension in the line 5, and the varying forces set up by the elements 3, 3A) operate so as to move the striker 4 and the shank 1 towards and away from one another in oscillatory manner. The part 4B, repeatedly impacting the shank 1, produces a series of percussions which judging from practical results, effectively attracts predatory fish.

The diagrams FIGS. 2, 3, and 4 illustrate the action of the lure which is presumed to be streamed at the end of the line 5. This must not be taken to be exact representations but they indicate approximately a sequence of phases. In FIG. 2 the elements 3, 3A being so lowered as to produce positive lift have raised the hook about pin 4D, away from the striker 4. At some limiting condition the elements 3, 3A reverse their general curvature or chamber, as seen in FIG. 3, so that negative lift results; the hook and striker come together with considerable impact the part 4B straddling the shank of the hook and the bottom of its channel-section striking the shank. This condition (i.e., the moment of impact) is seen in FIG. 4, and the general curvature of 3, 3A has again reversed. In fact, (and no attempt has been made in the illustrations to show it) the relative movement of the hook and striker are in part due to the fact that the direction of tension in the line 5 varies slightly due to the movement of the striker relative to the direction of drag of the hook and its hydrofoil elements, so that the striker oscillates as well as the hook. Indeed oscillation of the striker about pin 6 is probably a greater factor in producing the rattling impacts than oscillation of the hook. Indeed there is ground for believing that the elements 3, 3A, chiefly serve the purpose of producing a fairly high-pitched high-pitched "-humming" noise whilst the rattling effect is of course quite different both in frequency and wave-form. Nevertheless the drag caused by the hook and its elements, having regard to the fact that the line and the pivot axes change their alignment, is the main cause of the striker effect.

It has been found that with some fish, especially hard-mouthed species, the hook which normally enters the roof of the mouth can disengage; it may therefore be advantageous to provide a secondary smaller hook as represented at 7, attached to the striker, and in the same plane as the hook 1B, to ensure a firm strike in the fish's mouth.

It has been found that in some cases the barb of the hook if conventionally placed on the inner or concave side of the hook, can damage the flexible element 3; for that reason it may be located, as illustrated, on the outer or convex side.

It is clear that there may be many variants of the basic invention which is the combination of the undulatory oscillatory elements and the striker.

I claim:
1. A fishing lure comprising
    a hook
    a oscillatory unstable first hydrofoil element adapted so to vibrate in a relative stream of water as to generate continuous sound waves in the water
    means interattaching said hook and said first element so as to permit such vibration
    a separately oscillating unstable hydrofoil striker element and
    means interattaching said hook and said striker element so that the oscillations of said striker element due to the same relative stream result in repeated percussion of said striker element against the hook.

2. A lure according to claim 1 in which the second hydrofoil element is so formed that it acts as an inherently rigid hydrofoil.

3. A lure according to claim 1 in which the said first hydrofoil element is a flexible leaflike element so attached to the hook as to exert a tension load on the hook at a first axis which is transverse to the plane in which the hook is formed, the said hydrofoil striker element being a rigid element which is pivotally attached to the hook at said first axis and to the hook line at a second axis which is spaced from the first axis and so located with respect thereto that oscillations about the first axis due to the instability of the striker element are caused by the introduction of tension transmitted from the line to the hook through that part of the striker element which interconnects the two axes, such oscillations causing repeated percussions between the hook and the striker element.

4. A lure according to claim 3, in which the first hydrofoil element is formed of pliable sheet material, is attached first to the hook near the forward or upstream end of the shank thereof, is attached with some freedom to the hook itself by being impaled thereon, and lies, if stretched flat and unattached, in a plane substantially normal to the plane in which the bend of the hook lies.

5. A lure according to claim 4 in which the pliable hydrofoil element when impaled, is so dimensioned that it lies in a curve between its attachment and the locality of its impalement.

6. A lure according to claim 5 in which the pliable hydrofoil element comprises two laminae of the pliable material one of which is substantially longer than the other in the direction of streaming.

7. A lure according to claim 6 in which the laminae have perforations through their thicknesses in the region of their impalement on the hook.

8. A fishing lure comprising:
a hook with a shank,
a striker element attached with angular freedom about a first axis to the shank and with angular freedom about a second axis spaced from the first and connected to a hook line so that part of its length forms a link between the shank and the line,
the striker element being wholly of sheet material and providing a water passageway therethrough so as to be oscillated by the relative flow of water in which it is streamed, and
the striker element extending rearwardly from that part which forms the link so as to be able percussively to impact the shank between the said first axis and the hook itself.

9. A fishing lure as claimed in claim 8 further comprising
a flexible element such as to vibrate at an acoustic frequency its vibration being caused by the flow past it of water in which the hook is streamed
and means interattaching the flexible element and hook so as to permit such vibration.

10. A lure according to claim 9 in which the hook has its barb on its outer or convex side.

11. A lure according to claim 8 in which the striker is an element which is of generally U-section, to the flanges of which at its forward or upstream end is freely pivotally attached a ring which lies in the same plane as the bend of the hook, the element being also freely pivotally attached to the forward or upstream end of the shank of the hook on an axis transverse to the plane of the ring, and the flanges of which at the rear or downstream end straddle the hook shank so that the floor of the U-section in this region can strike the shank when the hook and the striker come together angularly about their mutual pivot.

12. A lure according to claim 11 in which the floor of the U-section of the striker element is removed throughout part of its length upstream from the part of the floor which strikes the shank, to form an aperture for the passage of water so that the said floor part can act as a hydrofoil.

13. A lure according to claim 11 in which a secondary hook is provided extending in substantially the plane of the first and in opposite sense.

* * * * *